United States Patent
Anders et al.

(10) Patent No.: US 10,902,072 B2
(45) Date of Patent: Jan. 26, 2021

(54) INDIRECT CROWDSOURCING BY ASSOCIATING DATA FROM MULTIPLE DATA SOURCES

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Leo Kluger, Spring Valley, NY (US); William Reilly, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 15/825,927

(22) Filed: Nov. 29, 2017

(65) Prior Publication Data

US 2019/0163831 A1  May 30, 2019

(51) Int. Cl.
| | | |
|---|---|---|
| G06F 16/00 | (2019.01) | |
| G06F 16/9535 | (2019.01) | |
| G06F 9/54 | (2006.01) | |
| G06F 16/48 | (2019.01) | |
| G06F 16/2458 | (2019.01) | |
| G06Q 30/02 | (2012.01) | |
| G06Q 50/00 | (2012.01) | |

(52) U.S. Cl.
CPC ............ *G06F 16/9535* (2019.01); *G06F 9/54* (2013.01); *G06F 16/2465* (2019.01); *G06F 16/48* (2019.01); *G06Q 30/0201* (2013.01); *G06F 2216/03* (2013.01); *G06Q 50/01* (2013.01)

(58) Field of Classification Search
CPC .. G06F 16/2465; G06F 16/48; G06F 16/9535; G06F 2216/03; G06Q 30/0201; G06Q 50/01
See application file for complete search history.

(56) References Cited

U.S. PATENT DOCUMENTS 9,084,122 B2   7/2015  Gao et al.
9,329,597 B2   5/2016  Stoschek et al.
(Continued)

OTHER PUBLICATIONS

Zhengxiang Pan, Han Yu, Chunyan Miao, and Cyril Leung, "Efficient Collaborative Crowdsourcing", Proceedings of the Thirtieth AAAI Conference on Artificial Intelligience (AAAI-16), pp. 4248-4229, 2016. (Year: 2016).*

(Continued)

*Primary Examiner* — Cheryl Lewis
(74) *Attorney, Agent, or Firm* — Michael O'Keefe; Andrew D. Wright; Roberts, Calderon, Safran & Cole, P.C.

(57) ABSTRACT

A computer-implemented method includes: receiving, by a computing device, information identifying the presence of a crowdsourcing event; receiving, by a computing device, indirect crowdsourcing data including user device activity from a plurality of user devices within a geofence associated with the crowdsourcing event; generating, by the computing device, indirect crowdsourcing data records based on the indirect crowdsourcing data; receiving, by the computing device, a query relating to the crowdsourcing event; generating, by the computing device, a query response in response to the query based on the indirect crowdsourcing data records; and providing by the computing device, the query response.

20 Claims, 8 Drawing Sheets

(56) References Cited

U.S. PATENT DOCUMENTS

| | | | |
|---|---|---|---|
| 9,674,134 B2 | 6/2017 | Djin et al. | |
| 10,482,441 B1* | 11/2019 | Watson | G06Q 20/401 |
| 2013/0254880 A1 | 9/2013 | Alperovitch et al. | |
| 2013/0263084 A1 | 10/2013 | Kesavan et al. | |
| 2015/0148061 A1* | 5/2015 | Koukoumidis | H04W 4/022 455/456.1 |
| 2017/0046878 A1 | 2/2017 | Dobslaw | |
| 2017/0337287 A1* | 11/2017 | Gill | G06N 5/04 |

OTHER PUBLICATIONS

Mell et al., "The NIST Definition of Cloud Computing", NIST, Special Publication 800-145, Sep. 2011, 7 pages.

Misra et al. "Crowdsourcing and Its Application to Transportation Data Collection and Management", Transportation Research Record 2414, 2014, 8 pages.

Anonymous, "System to Streamline Access and Classification of Collaborative Environments with Crowd-Sourced Review", IP.com, Jan. 24, 2017, 5 pages.

\* cited by examiner

INDIRECT CROWDSOURCING BY ASSOCIATING DATA FROM MULTIPLE DATA SOURCES

BACKGROUND

The present invention generally relates to crowdsourcing and, more particularly, to indirect crowdsourcing by associating data from multiple data sources.

Crowdsourcing refers to a sourcing model in which individuals or organizations use contributions from Internet users to obtain services, ideas, or share information. The information and work from crowdsourcing can originate from an undefined public (instead of being commissioned from a specific, named group) and crowdsourcing may include a mix of bottom-up and top-down processes. Crowdsourcing in the form of idea competitions or innovation contests provides a way for organizations to learn beyond what their "base of minds" of employees provides. Crowdsourcing can also involve rather tedious "microtasks" that are performed in parallel by large, paid crowds. Crowdsourcing has also been used for noncommercial work and to develop common goods. Other examples of crowdsourcing may include sharing location-based data for the location of objects or individuals, determining road traffic and road conditions in real-time, determining popularity of products/services, sharing ideas for product designs, raising awareness of public issues, sharing pricing information for bargain shopping, etc.

Crowdsourcing campaigns or events may be established through social media platforms and/or other web-based platforms. Users may choose to participate in a crowdsourcing campaign by using their user devices to share ideas, pictures, videos, audio clips, documents, and/or other data relating to a subject or event associated with the crowdsourcing campaign or event. Typically, users would access a crowdsourcing platform and manually interact with user devices to upload or send data to be used for a crowdsourcing campaigns.

SUMMARY

In an aspect of the invention, a computer-implemented method includes: receiving, by a computing device, information identifying the presence of a crowdsourcing event; receiving, by a computing device, indirect crowdsourcing data including user device activity from a plurality of user devices within a geofence associated with the crowdsourcing event; generating, by the computing device, indirect crowdsourcing data records based on the indirect crowdsourcing data; receiving, by the computing device, a query relating to the crowdsourcing event; generating, by the computing device, a query response in response to the query based on the indirect crowdsourcing data records; and providing by the computing device, the query response.

In an aspect of the invention, there is a computer program product for supplementing direct crowdsourcing data, the computer program product comprising a computer readable storage medium having program instructions embodied therewith. The program instructions are executable by a computing device to cause the computing device to: monitor user device activity from a plurality of user devices; store indirect crowdsourcing data records that identify the user device activity; detect that the level of user device activity within an area exceeds a threshold; determine the presence of a crowdsourcing event based on the detecting that the level of user device activity within the area exceeds the threshold; and output information indicating the presence of the crowdsourcing event.

In an aspect of the invention, a system includes: a CPU, a computer readable memory and a computer readable storage medium associated with a computing device; program instructions to receive direct crowdsourcing data; program instructions to identify a crowdsourcing event from the direct crowdsourcing data; program instructions to establish a geofence based on the identified crowdsourcing event; program instructions to monitor indirect crowdsourcing activity within the geofence; program instructions to generate and store indirect crowdsourcing data records with analytics data associated with the crowdsourcing event; program instructions to determine attributes of publically posted content associated with the indirect crowdsourcing data, program instructions to update the indirect crowdsourcing data records with the determined attributes; program instructions to receive a crowdsourcing event query; and program instructions to generate and provide a response to the crowdsourcing event query. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
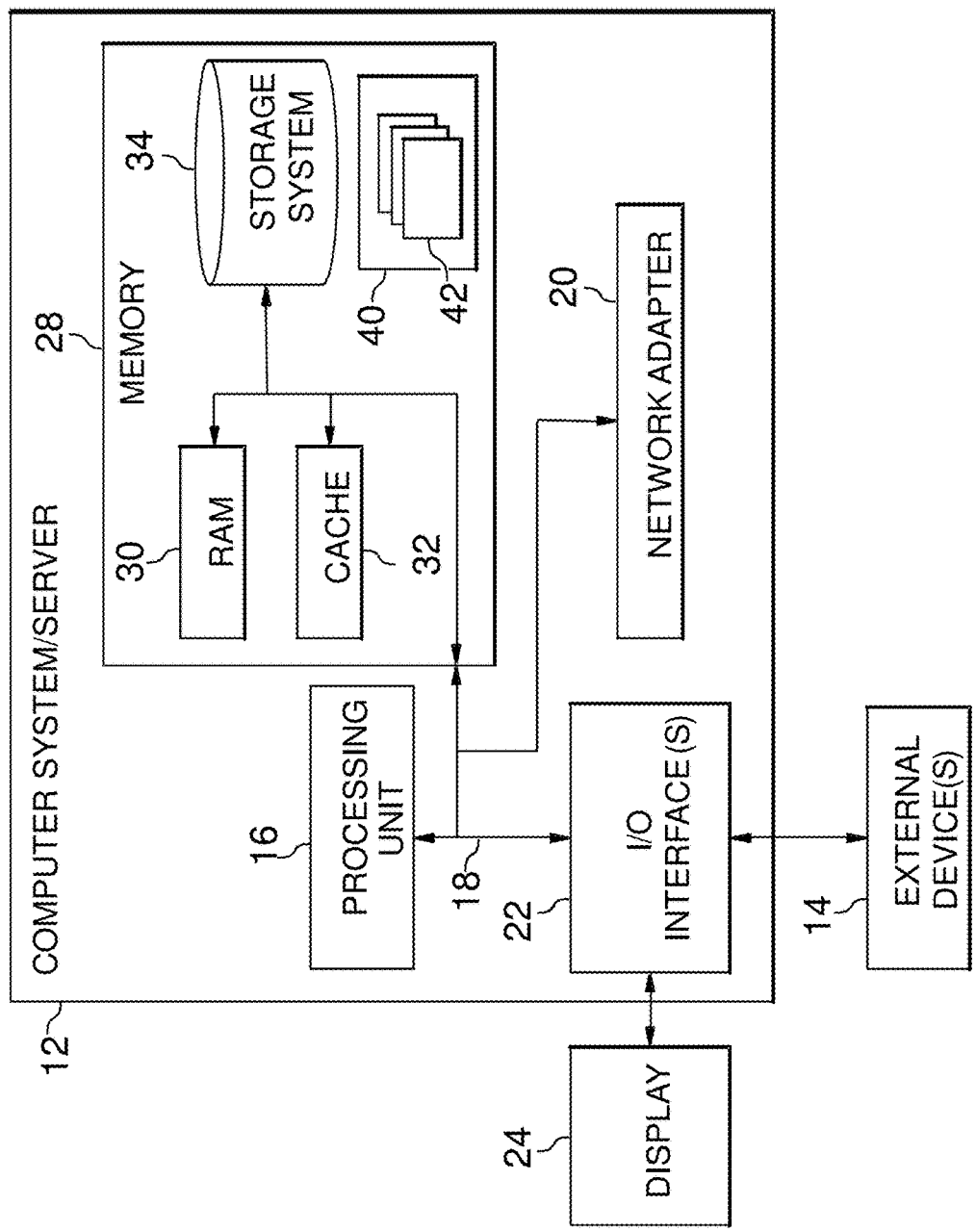
FIG. 1 depicts a cloud computing node according to an embodiment of the present invention.

The present invention generally relates to crowdsourcing and, more particularly, to indirect crowdsourcing by associating data from multiple data sources. Direct crowdsourcing involves an administrator establishing a crowdsourcing campaign or event, and users choosing to participate in a crowdsourcing campaign or event by using their user devices to share ideas, pictures, videos, audio clips, documents, and/or other data relating to a subject or event associated with the crowdsourcing campaign or event. In direct crowdsourcing, users access a crowdsourcing platform and manually interact with user devices to upload or send data to a web page or web-based application for a crowdsourcing campaign. Aspects of the present invention may implement indirect crowdsourcing to extend or supplement direct crowdsourcing data, thereby improving the amount of data that is available for a crowdsourcing campaign. Further, aspects of the present invention may automatically generate a crowdsourcing event based on indirect crowdsourcing techniques, as described herein.

In embodiments, aspects of the present invention may monitor user device activity for user devices located within a geofenced area associated with a previously established crowdsourcing event, generate user device activity records that store analytics of the user device activity, and associate the user device activity logs with the crowdsourcing event. More specifically, aspects of the present invention may associate user device activity and associated analytics without user involvement (e.g., "indirectly") such that a greater amount of data is available for the crowdsourcing event.

In embodiments, user device activity may include the capturing of an image or video, texting activity, web-browsing activity, social media activity, or the like. In embodiments, aspects of the present invention may store analytics of user device activity (but not the actual content of the activity), even if the user did not share their activity publically. For example, when a user takes a picture while within a geofenced area associated with a crowdsourcing event, aspects of the present invention may store analytics data of the picture, such as the geographic coordinates where the picture was taken, the size of the picture, etc. The image itself remains private, however, the analytics data surrounding the image may be used for crowdsourcing purposes. For example, the analytics data may be used to indicate that the image was taken at a particular time and location, and this data, along with other user device activity records indicating that other videos/pictures were taken at similar times and locations, could be used to indicate the popularity of a crowdsourcing event, or, if a crowdsourcing event was not previously establish, the user device activity records could indicate the presence of a noteworthy event, whereby a crowdsourcing event could be automatically created.

If the user chooses to share the picture, aspects of the present invention may analyze the content of the picture to determine its attributes (e.g., using image analysis and/or facial recognition techniques) and may store the attributes as part of the dataset included in the crowdsourcing event. Further, aspects of the present invention may group and/or categorize the picture with other pictures/videos having similar attributes, and may assign labels to the picture based on its attributes. For example, if the picture contains an individual, the picture may be grouped with other pictures containing the same individual. In embodiments, the attributes of the picture may be added to the dataset of the crowdsourcing event even if the user does not upload the picture to the crowdsourcing event platform (e.g., if the user shares the picture to a different public webpage or public forum). In this way, additional data is available for the crowdsourcing event even when users do not actively participate in sharing data/images/videos for the crowdsourcing event.

While aspects of the present invention may track the location of user devices, location tracking may occur on an "opt-in" basis in which a user provides explicit permission for location to be tracked within a geofenced area. Further, location tracking may be implemented in accordance with applicable privacy laws and may be discontinued at any time for users who have revoked permission for location tracking. While user input may be initially required to provide explicit user permission to track user location and user device activity, aspects of the present invention may advantageously collect data for crowdsourcing events based on user activity and location information without requiring additional user input to provide data for the crowdsourcing event.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
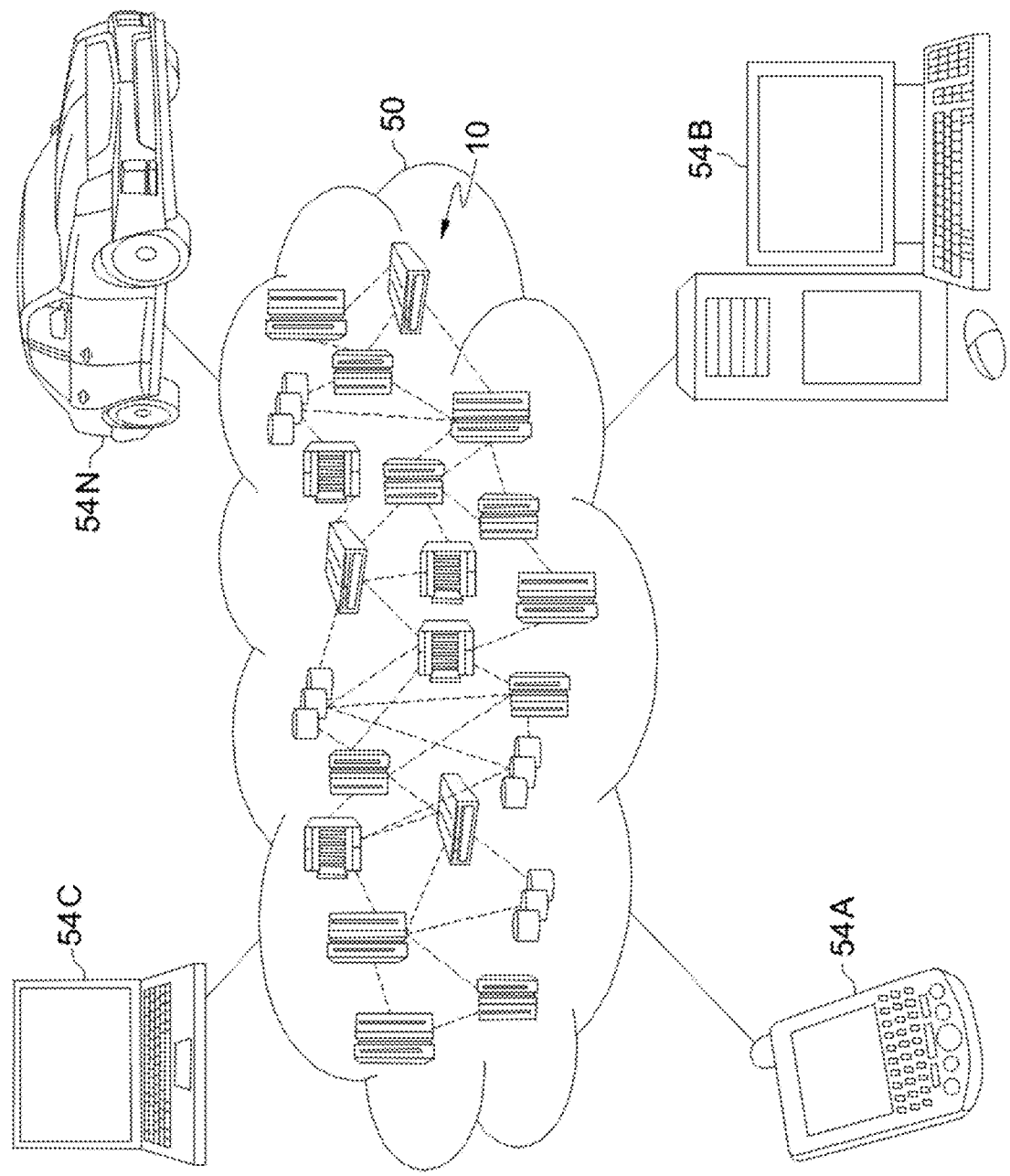
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
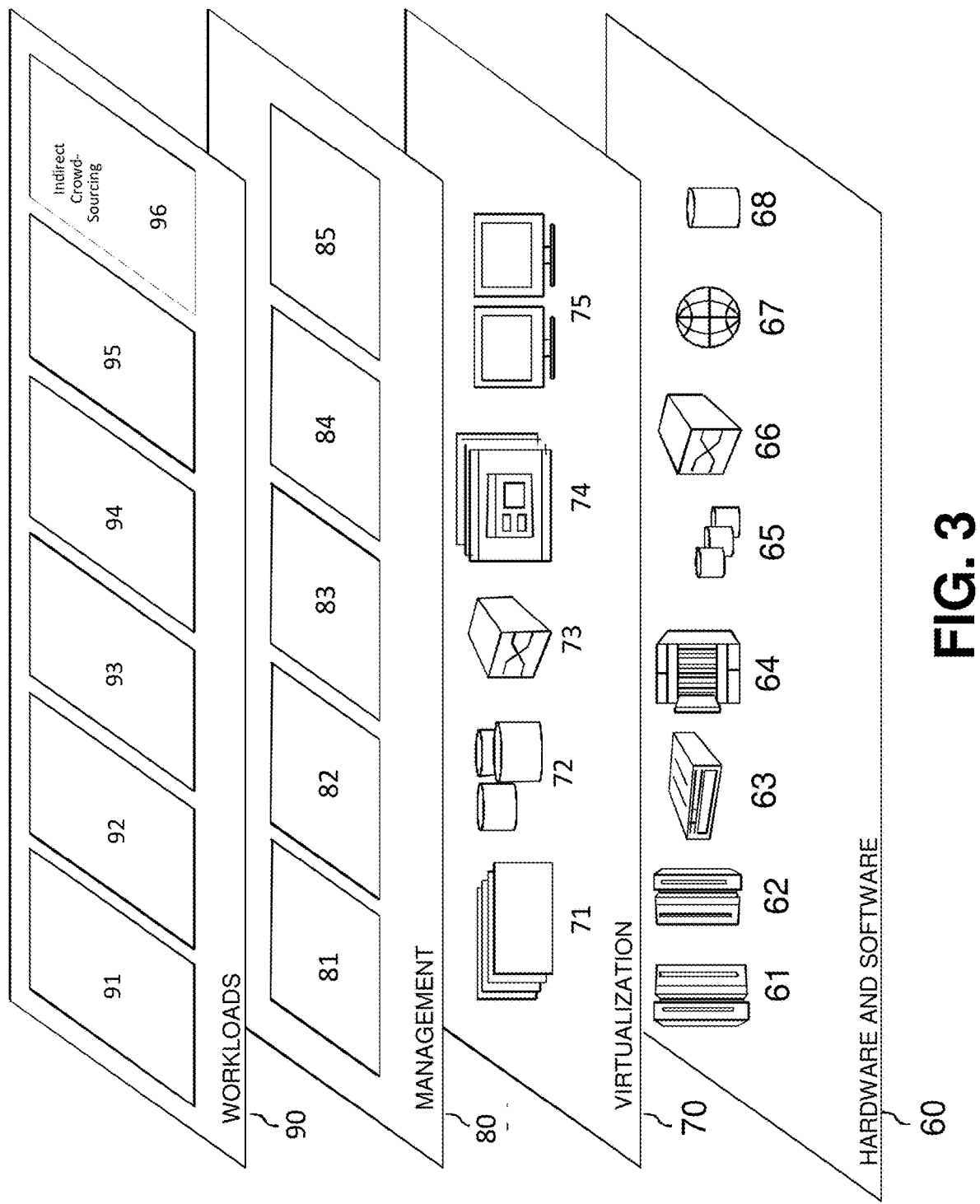
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and indirect crowdsourcing 96.

Referring back to FIG. 1, the program/utility 40 may include one or more program modules 42 that generally carry out the functions and/or methodologies of embodiments of the invention as described herein (e.g., such as the functionality provided by indirect crowdsourcing 96). Specifically, the program modules 42 may receive direct crowdsourcing data, identify a crowdsourcing event, establish a geofence, monitor user device activity within a geofence, store user device activity associated with crowdsourcing data, determine attributes of publically posted user device activity, group publically posted user device activity, and output information regarding crowdsourcing event. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an indirect crowd sourcing server 220 as shown in FIG. 4.

Figure 4:
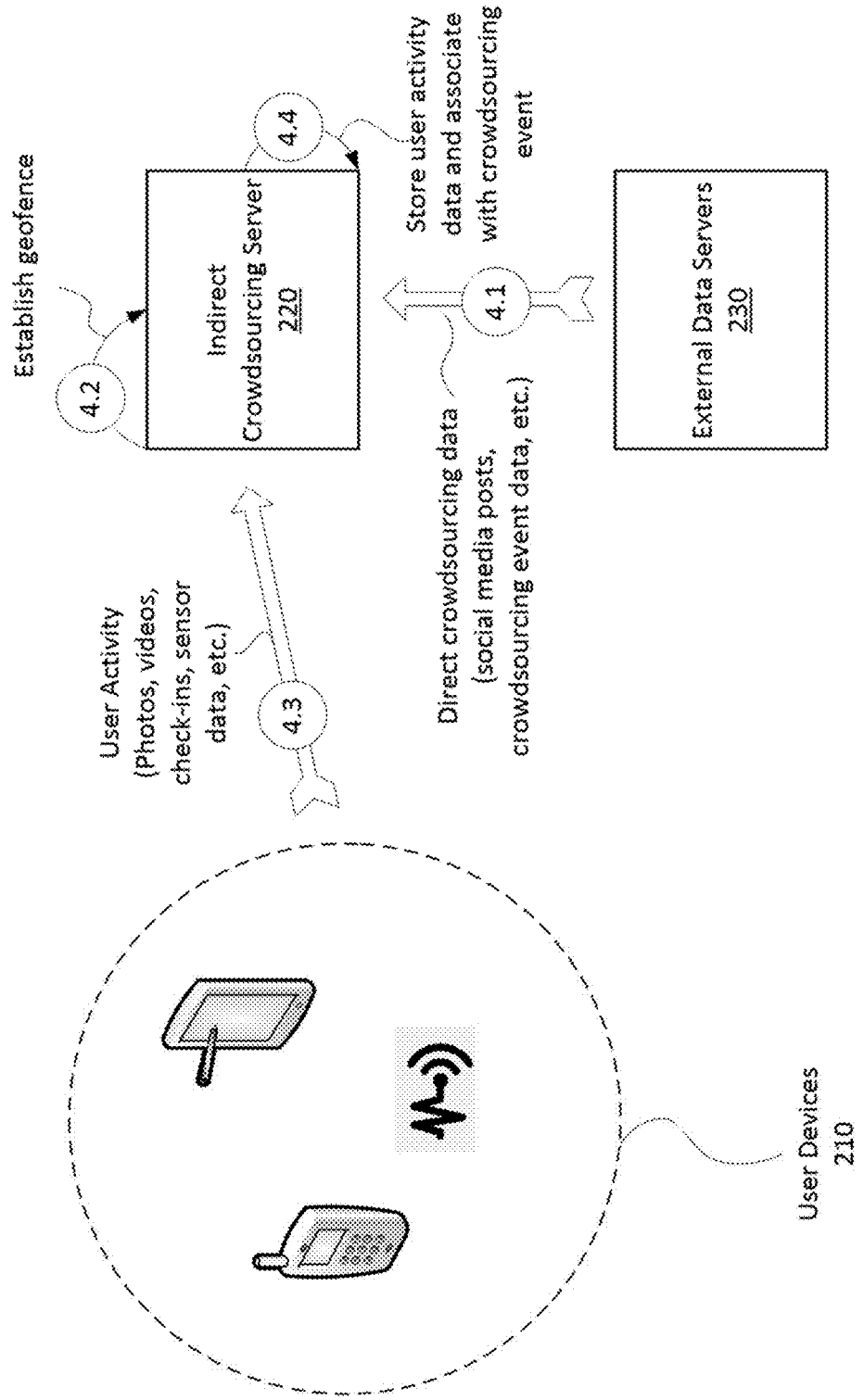
FIG. 4 shows an overview of an example implementation in accordance with aspects of the present invention

FIG. 4 shows an overview of an example implementation in accordance with aspects of the present invention. As shown in FIG. 4, an indirect crowdsourcing server 220 may receive direct crowdsourcing data from one or more external data servers 230 (step 4.1). The direct crowdsourcing data may include social media posts, crowdsourcing event data, and/or other information that defines the presence of a crowdsourcing event. In embodiments, the direct crowdsourcing data may identify a time period and location for a crowdsourcing event. Based on receiving the direct crowdsourcing data, the indirect crowdsourcing server 220 may establish a geofence (step 4.2) based on the information from the direct crowdsourcing data. The indirect crowdsourcing server 220 may monitor user device activity of user devices 210 within the geofence, and may obtain user device activity information (at step 4.3). For example, the indirect crowdsourcing server 220 may obtain (without user interaction) information indicating when the user devices 210 were used to take photos, take videos, check-in to the crowdsourcing event, send an e-mail, text, gather sensor data, etc.). Further, the user activity information may include metadata, such as the size, time or duration of video taken, types of sensor data gathered, type of user device activity (e.g., video/image capture, e-mail/text sending), etc. As described herein, the content of the user activity may not initially be analyzed unless the content is shared.

At step 4.4, the indirect crowdsourcing server 220 may store the user device activity and associate the user device activity with the crowdsourcing event. If content associated with a user device activity record was not shared, the stored user device activity may include the user device activity record with the metadata only. If the content is shared (e.g., to a public forum, webpage, social media platform, etc.), the indirect crowdsourcing server 220 may analyze the content to determine attributes of the content, and store the attributes of the content as part of the user device activity records. In this way, a crowdsourcing event may be associated with user device activity records that at least include a series of metadata, and when content is shared publically, the crowdsourcing event may be associated with user device activity records that identify additional attributes. In this way, indirect crowdsourcing data (e.g., user device activity data that is provided in the background of user device tasks) may augment direct crowdsourcing data such that richer data is available for analyzing crowdsourcing data.

In an illustrative example, a crowdsourcing event has been previously established for an event (e.g., a sporting event for the team "Ogdenville Isotopes"). Further, a location of the event has been defined (e.g., the location "Isotopes Stadium"). Given these conditions, the indirect crowdsourcing server 220 may receive the crowdsourcing event data (at step 4.1), establish a geofence to include Isotopes Stadium (at step 4.2), and monitor the user device activity for user devices located within "Isotopes Stadium" during a time of the crowdsourcing event (at step 4.3). Continuing with the example, a user takes a picture at the event during the event time. As described herein, aspects of the present invention may monitor the user device activity (e.g., a record indicating that the user took a picture) and store analytics information associated with the user device activity as crowdsourcing data even if the user does not manually upload or share the picture to the crowdsourcing event, and even if the user does not share the picture to any other public forum (at step 4.4). In this way, additional data is available for the crowdsourcing event while keeping the picture itself private.

Continuing with the above example, aspects of the present invention may further analyze the attributes of the picture if the user chooses to publically share the picture. The attributes are then added to the dataset, thereby making even more data available for the crowdsourcing event. Further, the picture may be grouped with other pictures having similar attributes. As an example, assume that the picture includes a player (e.g., Player A). The indirect crowdsourcing server 220 may use image analysis/facial recognition techniques to identify the player is Player A, store information that the picture includes Player A, and group the picture with other pictures of Player A.

In embodiments, the indirect crowdsourcing server 220 may receive queries regarding crowdsourcing data that may be responded using both direct crowdsourcing data (e.g., pictures/videos, and/or other data posted directly to a crowdsourcing event by a user), or indirect crowdsourcing data (e.g., user device activity, pictures/videos, and/or other data that was not posted directly to a crowdsourcing event by a user, but was detected by monitoring user device activity within a geofenced location of the crowdsourcing event). In this way, query responses may be generated using a set of data that includes both direct an indirect crowdsourcing data. Examples of queries and corresponding responses may include metrics reporting, data analysis, content grouping, slideshow generation, and/or any variety of applications that utilizes direct and indirect crowdsourcing data.

Figure 5:
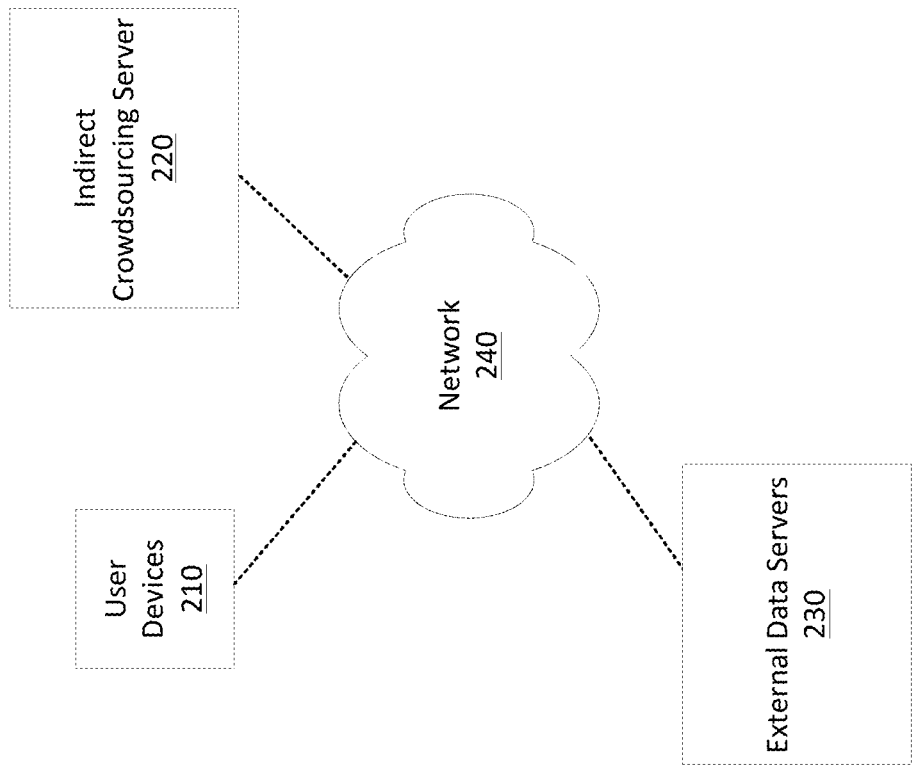
FIG. 5 shows an example environment in accordance with aspects of the present invention.

FIG. 5 shows an example environment in accordance with aspects of the present invention. As shown in FIG. 5, environment 500 may include one or more user devices 210, an indirect crowdsourcing server 220, one or more external data servers 230, and a network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 240. For example, the user device 210 may correspond to a mobile communication device (e.g., a smart phone or a personal digital assistant (PDA)), a portable computer device (e.g., a laptop or a tablet computer), or another type of computing device. In some embodiments, the user device 210 may also include an Internet of Things (IoT) device, a sensor device, or the like. As described herein, the user device 210 may provide user device activity data to the indirect crowdsourcing server 220 as a background process to supplement or augment direct crowdsourcing data.

The indirect crowdsourcing server 220 may include one or more computing devices (e.g., such as computer system/server 12 of FIG. 1) that obtain user device activity from one or more user devices 210 located within a geofenced area associated with a crowdsourcing event. In embodiments, the indirect crowdsourcing server 220 may receive direct crowdsourcing data, identify a crowdsourcing event, establish a geofence, monitor user device activity within a geofence, store user device activity associated with crowdsourcing data, determine attributes of publically posted user device activity, group publically posted user device activity, and output information regarding crowdsourcing event.

The external data server 230 may include one or more computing devices (e.g., such as computer system/server 12 of FIG. 1) that host social media platforms, crowdsourcing platforms, data sharing platforms, web sharing platforms, etc. In embodiments, the external data server 230 may provide direct crowdsourcing data that the indirect crowdsourcing server 220 may use to determine the presence of a crowdsourcing event in a particular geographic area.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
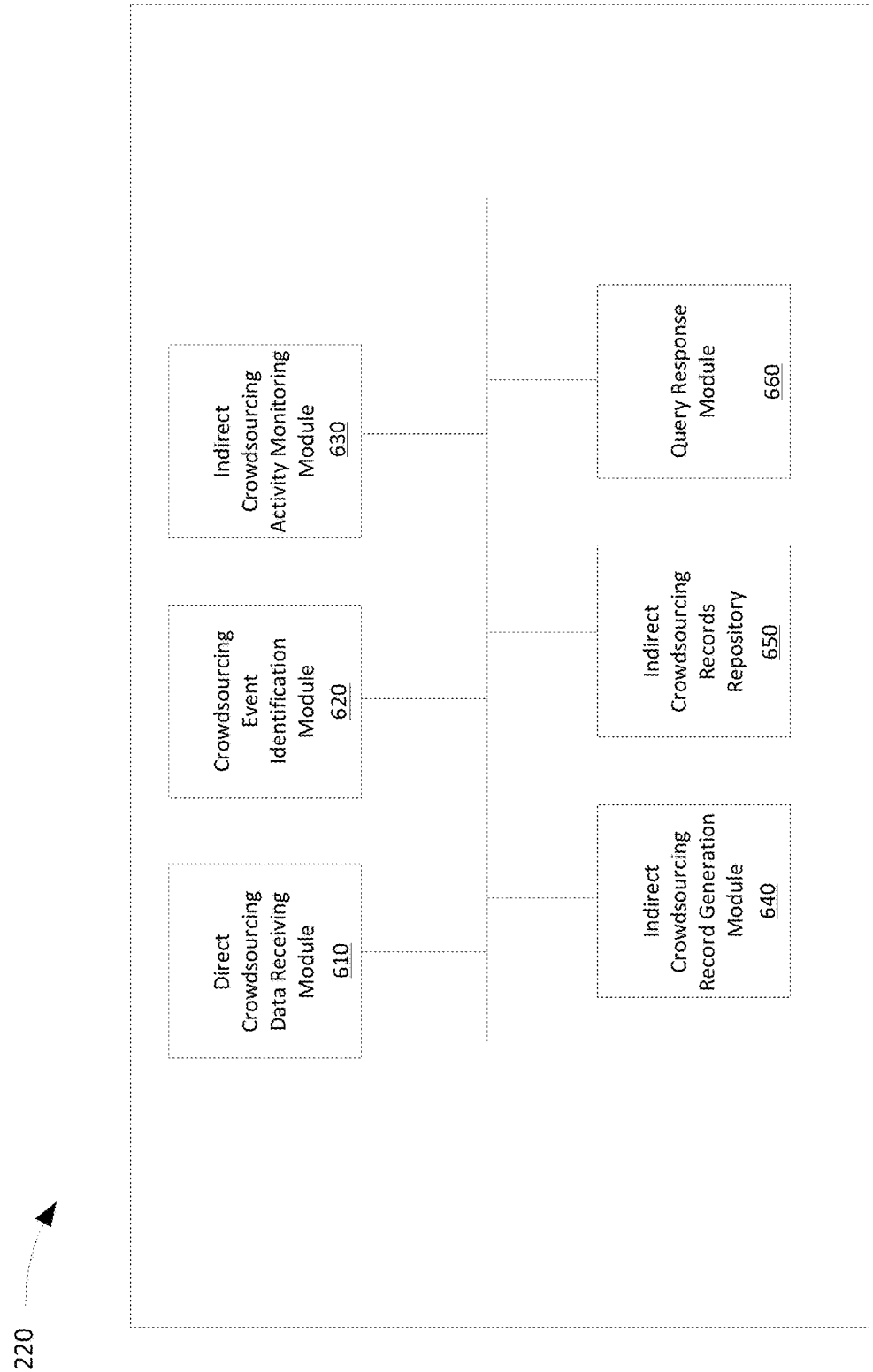
FIG. 6 shows a block diagram of example components of an indirect crowdsourcing server in accordance with aspects of the present invention.

FIG. 6 shows a block diagram of example components of an indirect crowdsourcing server in accordance with aspects of the present invention. As shown in FIG. 6, the indirect crowdsourcing server 220 may include a direct crowdsourcing data receiving module 610, a crowdsourcing event identification module 620, an indirect crowdsourcing activity monitoring module 630, an indirect crowdsourcing record generation module 640, an indirect crowdsourcing records repository 650, and a query response module 660. In embodiments, the indirect crowdsourcing server 220 may include additional or fewer components than those shown in FIG. 6. In embodiments, separate components may be integrated into a single computing component or module. Additionally, or alternatively, a single component may be implemented as multiple computing components or modules.

The direct crowdsourcing data receiving module 610 may include a program module (e.g., program module 42 of FIG. 1) that receives direct crowdsourcing data (e.g., from one or more external data servers 230). The direct crowdsourcing data may include information that identifies a crowdsourcing event (e.g., an event that has been established by an administrator as a crowdsourcing event). Additionally, the direct crowdsourcing data may include images, videos, check-ins, and/or other information posted by users in connection with the crowdsourcing event.

The crowdsourcing event identification module 620 may include a program module (e.g., program module 42 of FIG. 1) that may identify a crowdsourcing event from the direct crowdsourcing data received from the direct crowdsourcing data receiving module 610. In embodiments, the crowdsourcing event identification module 620 may identify a time and duration of the event, as well as a geographic area in which the event is taking place. As described herein, the crowdsourcing event identification module 620 may identify or detect a crowdsourcing event from indirect crowdsourcing data (e.g., based on a relatively high presence of user device activity in an area of a threshold distance during a threshold period of time).

The indirect crowdsourcing activity monitoring module 630 may include a program module (e.g., program module 42 of FIG. 1) that may monitor for indirect crowdsourcing activity (e.g., user device activity within a geofenced area of a crowdsourcing event). In embodiments, the indirect crowdsourcing activity monitoring module 630 may identify activity events of user devices 210 such as events relating to when a picture or video was taken, a check-in was made, a social media post was made, etc. As described herein, the indirect crowdsourcing activity monitoring module 630 may monitor user device activity of a user device 210 as a background process of user device 210 (e.g., without the user needing to actively provide user input). That is, the indirect crowdsourcing activity monitoring module 630 may gather indirect crowdsourcing data (e.g., user device activity that is provided as a background process without requiring user interaction).

The indirect crowdsourcing record generation module 640 may include a program module (e.g., program module 42 of FIG. 1) that may generate indirect crowdsourcing activity records for each user device activity event. For each user device activity event, the indirect crowdsourcing record generation module 640 may determine attributes, analytics, and/or metadata associated each event. For example, the indirect crowdsourcing record generation module 640 may determine the size of a picture that was captured by a user device 210, geographic coordinates where the picture was captured, a duration of a video that was captured, a time that a video or picture was captured, a time and location of a social media post, etc. The indirect crowdsourcing record generation module 640 may determine the attributes, analytics, and/or metadata of a user device activity event without analyzing the corresponding content (e.g., without analyzing the image, video, etc.). If content is posted or shared publically, the indirect crowdsourcing record generation module 640 may analyze the content and determine additional attributes (e.g., people, objects, scenes, etc. included in the content using image analysis/facial recognition techniques). The indirect crowdsourcing record generation module 640 may generate indirect crowdsourcing data records and store information identifying that attributes, analytics, metadata, and/or other information associated with each under device activity record.

The indirect crowdsourcing records repository 650 may include a data storage device (e.g., storage system 34 of FIG. 1) that stores user device activity records generated by the indirect crowdsourcing record generation module 640. In embodiments, the records stored by the indirect crowdsourcing records repository 650 may include indirect crowdsourcing data, and may be used to augment or supplement direct crowdsourcing data, and/or respond to queries regarding a crowdsourcing event.

The query response module 660 may include a program module (e.g., program module 42 of FIG. 1) that may receive a query regarding crowdsourcing data and generate and provide a response to the query. In embodiments, the query response module 660 may receive a query (e.g., from a user device 210 or from an application via an API call) to process both direct and indirect crowdsourcing data for metrics reporting, data analysis, content grouping, slideshow generation, and/or any other variety of applications. In embodiments, the query response module 660 may provide the response to the query in the form of an API query response with the queried information, a chart, graph, table, report, narrative with requested data, etc. As an example, the query response module 660 may receive a query regarding a number of individuals that captured pictures or videos for a crowdsourcing event. The query response module 660 may obtain direct crowdsourcing data indicating a number of individuals that manually uploaded pictures or videos to a crowdsourcing event, and may also obtain indirect crowdsourcing data (e.g., from the indirect crowdsourcing records repository 650) indicating a number of individuals that took pictures or videos on an indirect basis (e.g., times when users took pictures or videos that were not manually uploaded by the users to a crowdsourcing event).

As another example, the query response module 660 may receive a query to group photos and videos having a particular individual or object. In addition to grouping photos and videos of the particular individual that were posted directly to a crowdsourcing event, the query response module 660 may group the photos and videos from indirect crowdsourcing posts (e.g., posts of photos and videos that were publically posted but not to a crowdsourcing event). The query response module 660 may group the photos and videos from indirect crowdsourcing posts since the indirect crowdsourcing activity monitoring module 630 monitors indirect crowdsourcing activity (e.g., public postings of photos and videos within a geofenced location of a crowdsourcing event during a time period associated with the crowdsourcing event). In embodiments, the query response module 660 may add labels to the grouped photos/videos.

In embodiments, the query response module 660 may receive a query to identify an indirect crowdsourcing event based on indirect crowdsourcing activity. For example, the query response module 660 may identify a surge in user device activity in a particular geographic area during a particular time period, indicating the occurrence of an event that was not previously defined as a crowdsourcing event by an administrator. In embodiments the query response module 660 may receive any number of queries relating to processing and/or presenting direct and/or indirect crowdsourcing data.

Figure 7:
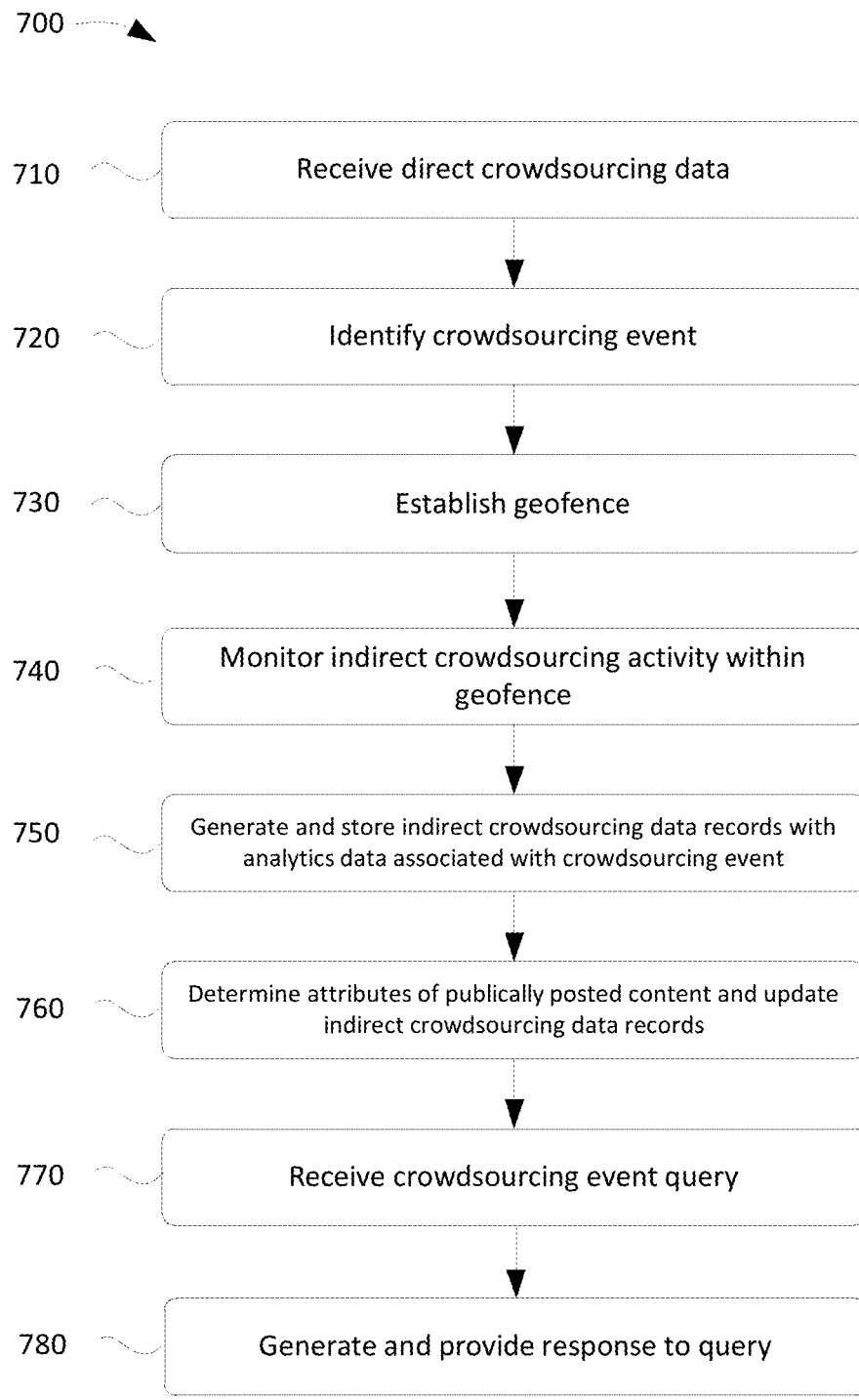
FIG. 7 shows an example flowchart of a process for gathering and processing indirect crowdsourcing data in accordance with aspects of the present invention.

FIG. 7 shows an example flowchart of a process for gathering and processing indirect crowdsourcing data in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include receiving direct crowdsourcing data (step 710). For example, as described above with respect to the direct crowdsourcing data receiving module 610, the indirect crowdsourcing server 220 may receive direct crowdsourcing data (e.g., from one or more external data servers 230).

Process 700 may also include identifying a crowdsourcing event (step 720). For example, as described above with respect to the crowdsourcing event identification module 620, the indirect crowdsourcing server 220 may identify a crowdsourcing event from the direct crowdsourcing data received from the direct crowdsourcing data receiving module 610. In embodiments, the indirect crowdsourcing server 220 may identify a time and duration of the event.

Process 700 may further include establishing a geofence (step 730). For example, as described above with respect to the crowdsourcing event identification module 620, the indirect crowdsourcing server 220 may establish a geofence by identifying a geographic area defined by the crowdsourcing event (which may be defined by an administrator of the crowdsourcing event, or may be determined using any suitable geofence determination technique).

Process 700 may also include monitoring indirect crowdsourcing activity within the geofence (step 740). For example, as described above with respect to the indirect crowdsourcing activity monitoring module 630, the indirect crowdsourcing server 220 may monitor for indirect crowdsourcing activity (e.g., user device activity within a geofenced area of a crowdsourcing event). In embodiments, the indirect crowdsourcing server 220 may identify activity events of user devices 210 (e.g., as a background process) such as events relating to when a picture or video was taken, a check-in was made, a social media post was made, etc.

Process 700 may further include generating and storing indirect crowdsourcing data records with analytics data associated with the crowdsourcing event (step 750). For example, as described above with respect to the indirect crowdsourcing record generation module 640, the indirect crowdsourcing server 220 may generate indirect crowdsourcing activity records for each user device activity event. For each user device activity event, the indirect crowdsourcing record generation module 640 may determine attributes, analytics, and/or metadata associated each event, and store this information in indirect crowdsourcing data records.

Process 700 may also include determining the attributes of publically posted content and updating the indirect crowdsourcing data records (step 760). For example, as described above with respect to the indirect crowdsourcing record generation module 640, the indirect crowdsourcing server 220 may analyze publically posted content and determine additional attributes (e.g., people, objects, scenes, etc. included in the content using image analysis/facial recognition techniques). The indirect crowdsourcing server 220 may update corresponding indirect crowdsourcing data records with the identified attributes.

Process 700 may further include receiving a crowdsourcing event query (step 770). For example, as described above with respect to the query response module 660, the indirect crowdsourcing server 220 may receive a query regarding crowdsourcing data. In embodiments, the query response module 660 may receive a query (e.g., from a user device 210 or from an application via an API call) to process both direct and indirect crowdsourcing data for metrics reporting, data analysis, content grouping, slideshow generation, and/or any other variety of applications.

Process 700 may also include generating and providing a response to the query (step 780). For example, as described above with respect to the query response module 660, the indirect crowdsourcing server 220 may generate a response to the query based on the query parameters. A response may be provided in the form of a data file or API query response, a report, chart, graph, table, narrative with requested data, etc. Examples of types of queries and responses to the queries are described above with respect to the query response module 660.

Figure 8:
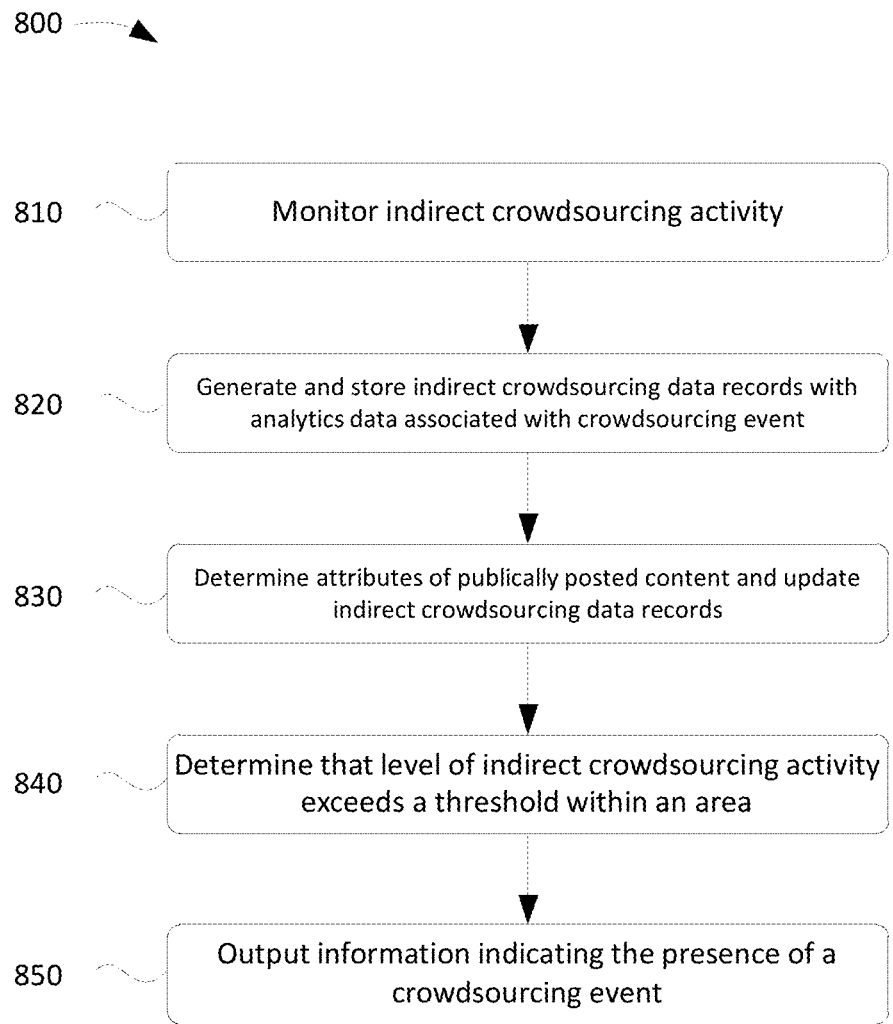
FIG. 8 shows an example flowchart of a process for detecting the presence of a crowdsourcing event based on indirect crowdsourcing data in accordance with aspects of the present invention.

FIG. 8 shows an example flowchart of a process for detecting the presence of a crowdsourcing event based on indirect crowdsourcing data in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention. FIG. 8 may be used to detect the presence of a crowdsourcing event when a crowdsourcing event has not been defined by a user on a crowdsourcing page or platform.

As shown in FIG. 8, process 800 may include monitoring indirect crowdsourcing activity (step 810). For example, the indirect crowdsourcing server 220 may monitor indirect crowdsourcing activity in a similar manner as described above with respect to step 740 of FIG. 7.

Process 800 may further include generating and storing indirect crowdsourcing data records with analytics data associated with the crowdsourcing event (step 820). For example, the indirect crowdsourcing server 220 may generate indirect crowdsourcing activity records for each user device activity event in a similar manner as described above with respect to step 750 of FIG. 7.

Process 800 may also include determining the attributes of publically posted content and updating the indirect crowdsourcing data records (step 830). For example, the indirect crowdsourcing server 220 may determine the attributes of publically posted content and update the indirect crowdsourcing data records in a similar manner as described above with respect to step 760 of FIG. 7.

Process 800 may further include determining that the level of indirect crowdsourcing activity exceeds a threshold within an area (step 840). For example, the indirect crowdsourcing server 220 may determine that the level of indirect crowdsourcing activity exceeds a threshold within the area (e.g., a number of user device activity events exceeds a threshold number within a threshold radius, such as a one-mile radius).

Process 800 may also include outputting information indicating the presence of a crowdsourcing event (step 850). For example, the indirect crowdsourcing server 220 may output information indicating the presence of a crowdsourcing event based on determining that the level of indirect crowdsourcing activity exceeds a threshold within the area. In this way, indirect crowdsourcing activity (e.g., user device activity) may be used to automatically detect the presence of a crowdsourcing event even when the crowdsourcing event is not manually established through a crowdsourcing page, application, or platform. Further, the indirect crowdsourcing server 220 may receive a crowdsourcing event query and generate and provide a response to the query using the stored indirect crowdsourcing activity records, in a similar manner as described in steps 770 and 780 of FIG. 7.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, information identifying the presence of a crowdsourcing event;
receiving, by the computing device, indirect crowdsourcing data including user device activity from a plurality of user devices within a pre-defined geofence associated with the crowdsourcing event;
generating, by the computing device, indirect crowdsourcing data records based on the indirect crowdsourcing data;
receiving, by the computing device, a query relating to the crowdsourcing event;
generating, by the computing device, a query response in response to the query based on the indirect crowdsourcing data records; and
providing by the computing device, the query response.

2. The method of claim 1, wherein the user activity of the indirect crowdsourcing data includes activity that is not directly posted to a page or platform associated with the crowdsourcing event.

3. The method of claim 1, wherein the query is received from an application via an application programming interface (API) and the query response is provided via the API.

4. The method of claim 1 wherein the query includes at least one selected from the group consisting of:
a query for metrics associated with the crowdsourcing event;
a query for images or videos associated with the crowdsourcing event;
a query for grouping of content associated with the crowdsourcing event; and
a data analysis query associated with the crowdsourcing event.

5. The method of claim 1, wherein the user device activity includes at least one selected from the group consisting of:
capturing of an image;
capturing of a video;
sending of a text or e-mail; and
gathering of sensor data.

6. The method of claim 1, further comprising:
detecting that the user device activity has been posted to a public forum;
determining the attributes of the content posted user device activity; and
updating the indirect crowdsourcing data records based the determining the attributes.

7. The method of claim 6, wherein the determining the attributes is based on at least one selected from the group consisting of:
image analysis techniques;
object recognition techniques; and
facial recognition techniques.

8. The method of claim 1, wherein the generating the query response is further based on direct crowdsourcing data.

9. The method of claim 1, wherein each indirect crowdsourcing data record identifies at least one of:
a type of user device activity;
a location in which the user device activity took place;
a duration of the user device activity; and
a file, image, or video size corresponding to the user device activity,
wherein the user device activity is provided as a background process without user instruction.

10. The method of claim 1, wherein a service provider at least one of creates, maintains, deploys and supports the computing device.

11. The method of claim 1, wherein the receiving the information identifying the presence of the crowdsourcing event, the receiving the indirect crowdsourcing data, the generating the indirect crowdsourcing data records, the receiving the query, and the generating the query response are provided by a service provider on a subscription, advertising, and/or fee basis.

12. The method of claim 1, wherein the computing device includes software provided as a service in a cloud environment.

13. The method of claim 1, further comprising deploying a system for supplementing direct crowdsourcing data, comprising providing a computer infrastructure operable to perform the receiving the information identifying the presence of the crowdsourcing event, the receiving the indirect crowdsourcing data, the generating the indirect crowdsourcing data records, the receiving the query, and the generating the query response.

14. A computer program product for supplementing direct crowdsourcing data, the computer program product comprising a computer readable storage medium having program instructions embodied therewith, the program instructions executable by a computing device to cause the computing device to:

monitor user device activity from a plurality of user devices;

store indirect crowdsourcing data records that identify the user device activity;

detect that the level of user device activity within an area exceeds a threshold;

determine the presence of a crowdsourcing event based on the detecting that the level of user device activity within the area exceeds the threshold; and output information indicating the presence of the crowdsourcing event.

15. The computer program product of claim 14, wherein each indirect crowdsourcing data record identifies at least one of:

a type of user device activity;

a location in which the user device activity took place;

a duration of the user device activity; and a file, image, or video size corresponding to the user device activity, wherein the user device activity is provided as a background process without user instruction.

16. The computer program product of claim 14, wherein the program instructions further cause the user device to receive a query relating to the crowdsourcing event;

generate a query response in response to the query based on the indirect crowdsourcing data records; and provide the query response.

17. The computer program product of claim 14, wherein the query includes at least one selected from the group consisting of:

a query for metrics associated with the crowdsourcing event;

a query for images or videos associated with the crowdsourcing event;

a query for grouping of content associated with the crowdsourcing event; and a data analysis query associated with the crowdsourcing event.

18. The computer program product of claim 14, wherein the user activity of the indirect crowdsourcing data includes activity that is not directly posted to a page or platform associated with the crowdsourcing event.

19. A system comprising:

a CPU, a computer readable memory and a computer readable storage medium associated with a computing device;

program instructions to receive direct crowdsourcing data;

program instructions to identify a crowdsourcing event from the direct crowdsourcing data;

program instructions to establish a geofence based on the identified crowdsourcing event;

program instructions to monitor indirect crowdsourcing activity within the geofence;

program instructions to generate and store indirect crowdsourcing data records with analytics data associated with the crowdsourcing event;

program instructions to determine attributes of publically posted content associated with the indirect crowdsourcing data;

program instructions to update the indirect crowdsourcing data records with the determined attributes;

program instructions to receive a crowdsourcing event query; and program instructions to generate and provide a response to the crowdsourcing event query, wherein the program instructions are stored on the computer readable storage medium for execution by the CPU via the computer readable memory.

20. The system of claim 19, wherein the indirect crowdsourcing data includes user device activity that is not directly posted to a page or platform associated with the crowdsourcing event.

\* \* \* \* \*